United States Patent
Ogihara et al.

(10) Patent No.: US 11,472,068 B2
(45) Date of Patent: Oct. 18, 2022

(54) THERMOPLASTIC RESIN COMPOSITION FOR CLEANING MOLDING PROCESSING MACHINE

(71) Applicant: Daicel Polymer Ltd., Tokyo (JP)

(72) Inventors: Takayuki Ogihara, Himeji (JP); Toru Nakano, Himeji (JP)

(73) Assignee: DAICEL POLYMER LTD., Tokyo (JP)

(*) Notice: Subject to any disclaimer, the term of this patent is extended or adjusted under 35 U.S.C. 154(b) by 135 days.

(21) Appl. No.: 16/473,826

(22) PCT Filed: Mar. 1, 2018

(86) PCT No.: PCT/JP2018/007748
§ 371 (c)(1),
(2) Date: Jun. 26, 2019

(87) PCT Pub. No.: WO2018/159752
PCT Pub. Date: Sep. 7, 2018

(65) Prior Publication Data
US 2019/0337193 A1     Nov. 7, 2019

(30) Foreign Application Priority Data
Mar. 3, 2017   (JP) .............. JP2017-040700

(51) Int. Cl.
| | | |
|---|---|---|
| *B29C 33/72* | (2006.01) | |
| *C08K 3/34* | (2006.01) | |
| *C08K 5/103* | (2006.01) | |
| *C08K 7/14* | (2006.01) | |
| *C08L 53/02* | (2006.01) | |
| *C08L 71/02* | (2006.01) | |

(52) U.S. Cl.
CPC .............. *B29C 33/722* (2013.01); *C08K 3/34* (2013.01); *C08K 5/103* (2013.01); *C08K 7/14* (2013.01); *C08L 53/02* (2013.01); *C08L 71/02* (2013.01)

(58) Field of Classification Search
CPC ........ B29C 33/722; C08K 3/34; C08K 5/103; C08K 7/14; C08L 53/02; C08L 71/02
See application file for complete search history.

(56) References Cited

U.S. PATENT DOCUMENTS

| | | | | |
|---|---|---|---|---|
| 2014/0371125 A1* | 12/2014 | Wakita | .......... | B29C 33/72 510/188 |
| 2015/0021802 A1 | 1/2015 | Wakita | | |
| 2015/0051314 A1 | 2/2015 | Cho et al. | | |

FOREIGN PATENT DOCUMENTS

| | | | | |
|---|---|---|---|---|
| CN | 104302690 A | | 1/2015 | |
| JP | 03-140214 A | | 6/1991 | |
| JP | 05-039499 | * | 2/1993 | ............ C11D 1/825 |
| JP | 06-299194 | * | 10/1994 | ............... C11D 7/08 |
| JP | 09-277274 A | * | 10/1997 | ............ B29C 33/72 |
| JP | 2011-046808 A | | 3/2011 | |
| JP | 2011-083972 A | | 4/2011 | |
| JP | 2012-140481 A | | 7/2012 | |
| JP | 2013-154484 A | | 8/2013 | |
| JP | 2013155220 A | | 8/2013 | |
| JP | 2014-077049 A | | 5/2014 | |
| WO | 2011/024828 A1 | | 3/2011 | |
| WO | 2012/090620 A1 | | 7/2012 | |

OTHER PUBLICATIONS

English Machine translation of JP 03-140214. (Year: 1991).*
English machine translation of JP 09-277274. (Year: 1997).*
English Translation of International Preliminary Report on Patentability and Written Opinion for PCT/JP2018/007748, dated May 1, 2018 (5 pages).
Japanese Office Action issued in corresponding Japanese Application No. 2019-503106 dated Oct. 26, 2021 (4 pages).
Taiwan Office Action issued in corresponding Taiwanese Application No. 11020479930 dated May 21, 2021 (5 pages).

* cited by examiner

*Primary Examiner* — John E Uselding
(74) *Attorney, Agent, or Firm* — Flynn Thiel, P.C.

(57) ABSTRACT

To provide a thermoplastic resin composition having an enhanced cleaning performance for cleaning a molding processing machine. The thermoplastic resin composition for cleaning a molding processing machine contains (A) an olefin-based resin, and (B) (B1) a nonionic surfactant having an HLB of 13 to 20, wherein the composition contains component (B) in an amount of 0.5 to 10 parts by mass relative to 100 parts by mass of component (A).

14 Claims, No Drawings

THERMOPLASTIC RESIN COMPOSITION FOR CLEANING MOLDING PROCESSING MACHINE

TECHNICAL FIELD

The present invention relates to a thermoplastic resin composition for cleaning a molding processing machine, for cleaning a molding processing machine such as an extruder or an injection molding machine.

BACKGROUND ART

As a cleaning agent of a thermoplastic resin composition for cleaning a molding processing machine, known are those having a base resin and other components combined with each other.

JP-A 2014-77049, JP-A 2013-154484, JP-A 2012-140481 and JP-A 2011-46808 disclose a thermoplastic resin composition for cleaning a molding processing machine, wherein a polyolefin resin as a base resin is combined with other components.

SUMMARY OF THE INVENTION

The problem to be solved by the present invention is to provide a thermoplastic resin composition having an enhanced cleaning performance for cleaning a molding processing machine.

The present invention provides a thermoplastic resin composition for cleaning a molding processing machine, which includes
(A) an olefin-based resin; and
(B) a nonionic surfactant (B1) having an HLB of 13 to 20,
wherein the composition contains component (B) in an amount of 0.5 to 10 parts by mass relative to 100 parts by mass of component (A).

The thermoplastic resin composition for cleaning of the present invention provides good detergency and workability in cleaning an interior of a molding processing machine.

DESCRIPTION OF EMBODIMENTS

Thermoplastic Resin Composition for Cleaning

Component (A)

Component (A) is an olefin-based resin. Examples of the olefin-based resin as component (A) include HDPE (high-density polyethylene), LDPE (low-density polyethylene), LLDPE (linear low-density polyethylene), polypropylene homopolymer, a copolymer of ethylene and propylene, and a copolymer of ethylene and/or propylene and a monomer copolymerizable therewith; and these may be used alone or in combination of two or more thereof. From the viewpoint of enhancing the cleaning performance, component (A) is preferably one or more selected from HDPE, LDPE, LLDPE and polypropylene homopolymer, and it is more preferably one or more selected from HDPE and polypropylene homopolymer.

A melt flow rate (hereinafter, referred to as MFR) (a weight of a resin flown out in 10 minutes (g/10 min)) of component (A) in conformity with ISO1133 is, in the case of a load of 2.16 kg at 190° C., preferably 0.01 to 6, and more preferably 0.01 to 3. Further, the MFR (g/10 min) of the component (A) is, in the case of a load of 2.16 kg at 230° C., preferably 0.5 to 15, and more preferably 0.5 to 10.

Component (B)

Component (B) is a nonionic surfactant.
Component (B1) is a nonionic surfactant having an HLB of 13 to 20. From the viewpoint of enhancing the cleaning performance, the HLB of component (B1) is preferably 14 to 20, and more preferably 16 to 20.

In the present invention, HLB is an abbreviation for hydrophile-lipophile balance, and is an index for enabling us to know whether a compound is hydrophilic or lipophilic, and the value thereof is 0 to 20. A lower HLB value indicates a higher lipophilicity. In the present invention, the HLB value is defined by Griffin' equation shown below.

$$HLB \text{ value} = 20 \times Mw/M,$$

wherein M represents a molecular weight of a nonionic surfactant and Mw represents a molecular weight of a hydrophilic moiety of the nonionic surfactant.

Examples of the nonionic surfactant as component (B1) include, within the above HLB range, a polyoxyalkylene-type nonionic surfactant, a sorbitan-type nonionic surfactant, a glyceride-type nonionic surfactant (glycerin (mono, di) fatty acid esters), a propylene glycol fatty acid ester, a sucrose fatty acid ester, a glycoside-type nonionic surfactant (alkyl polyglycoside, alkyl glucoside), and an aliphatic alkanolamide; and these may be used alone or in combination of two or more thereof.

Among these, from the viewpoint of enhancing the cleaning performance, component (B1) is, within the above HLB range, preferably a polyoxyethylene (mono, di) fatty acid ester, and more preferably a polyoxyethylene di-fatty acid ester. Further, when component (B1) is a polyoxyethylene (mono, di) fatty acid ester, the carbon number of one fatty acid moiety of the compound is preferably 8 to 22, and more preferably 12 to 18.

From the viewpoint of enhancing the cleaning performance, the thermoplastic resin composition for cleaning a molding processing machine of the present invention preferably contains, further as component (B2), a nonionic surfactant having an HLB of 1 to 12. That is, the thermoplastic resin composition for cleaning of the present invention preferably contains both of components (B1) and (B2) as component (B).

The HLB of component (B2) is preferably 1 to 10, more preferably 1 to 8, and further preferably 1 to 5, from the viewpoint of enhancing the cleaning performance.

Examples of the nonionic surfactant as component (B2) include, within the above HLB range, a polyoxyalkylene-type nonionic surfactant, a sorbitan-type nonionic surfactant, a glyceride-type nonionic surfactant (glycerin (mono, di) fatty acid esters), a propylene glycol fatty acid ester, a sucrose fatty acid ester, a glycoside-type nonionic surfactant (alkyl polyglycoside, alkyl glucoside), and an aliphatic alkanolamide; and these may be used alone or in combination of two or more thereof.

Among these, from the viewpoint of enhancing the cleaning performance, component (B2) is, within the above HLB range, preferably one or more selected from glycerin (mono, di) fatty acid esters and sorbitan (mono, di, tri) fatty acid esters; more preferably one or more selected from glycerin mono fatty acid esters and sorbitan tri fatty acid esters; and further preferably a glycerin mono fatty acid ester. Further, when component (B2) is a glycerin (mono, di) fatty acid ester, a carbon number of one fatty acid moiety of the compound is preferably 8 to 22, and more preferably 16 to 22. Further, when component (B2) is a sorbitan (mono, di, tri) fatty acid ester, a carbon number of one fatty acid moiety of the compound is preferably 8 to 22, and more preferably 12 to 22.

In the thermoplastic resin composition for cleaning a molding processing machine of the present invention, a content ratio of component (B) is, from the viewpoint of enhancing the cleaning performance, preferably 0.5 to 10 parts by mass, more preferably 1 to 10 parts by mass, further preferably 1 to 8 parts by mass, and furthermore preferably 3 to 7 parts by mass relative to a total of 100 parts by mass of component (A).

In the thermoplastic resin composition for cleaning a molding processing machine of the present invention, a content ratio of component (B1) is, from the viewpoint of enhancing the cleaning performance, preferably 0.25 to 5 parts by mass, more preferably 0.5 to 5 parts by mass, further preferably 0.5 to 4 parts by mass, and furthermore preferably 1.5 to 3.5 parts by mass relative to the total of 100 parts by mass of component (A).

In the thermoplastic resin composition for cleaning a molding processing machine of the present invention, a content ratio of component (B2) is, from the viewpoint of enhancing the cleaning performance, preferably 0.25 to 5 parts by mass, more preferably 0.5 to 5 parts by mass, further preferably 0.5 to 4 parts by mass, and furthermore preferably 1.5 to 3.5 parts by mass relative to the total of 100 parts by mass of component (A).

In the total amount of component (B1) and component (B2) in the thermoplastic resin composition for cleaning a molding processing machine of the present invention, a content ratio of component (B1) is, from the viewpoint of enhancing the cleaning performance, preferably 10 to 90 mass %; more preferably 20 to 80 mass %, further preferably 30 to 70 mass %, and furthermore preferably 40 to 60 mass %; and a content ratio of component (B2) is, from the viewpoint of enhancing the cleaning performance, preferably 90 to 10 mass %, more preferably 80 to 20 mass %, further preferably 70 to 30 mass %, and furthermore preferably 60 to 40 mass %.

From the viewpoint of enhancing the cleaning performance, the thermoplastic resin composition for cleaning a molding processing machine of the present invention preferably further contains a thermoplastic elastomer as component (C).

Examples of the thermoplastic elastomer as component (C) include a urethane elastomer, a polyester elastomer, an olefin-based elastomer, a polyamide elastomer, and a styrene-based elastomer; and these may be used alone or in combination of two or more of them.

As specific examples of component (C), exemplified are one or more selected from a styrene-butadiene-styrene block polymer (SBS), a styrene-isoprene-styrene block polymer (SIS), a hydrogenated styrene-ethylene-butylene-styrene block polymer (SEBS), a hydrogenated styrene-ethylene-propylene-styrene block polymer (SEPS), an ethylene-α olefin-based polymer, an ethylene-α olefin-polyene polymer, silicone rubber, acrylic rubber, and a butadiene-(meth) acrylate polymer; from the viewpoint of enhancing the cleaning performance, preferable are one or more selected from a styrene-butadiene-styrene block polymer (SBS), a styrene-isoprene-styrene block polymer (SIS), a hydrogenated styrene-ethylene-butylene-styrene block polymer (SEBS) and a hydrogenated styrene-ethylene-propylene-styrene block polymer (SEPS); and more preferable are one or more selected from a styrene-butadiene-styrene block polymer (SBS), a hydrogenated styrene-ethylene-butylene-styrene block polymer (SEBS) and a hydrogenated styrene-ethylene-propylene-styrene block polymer (SEPS); further preferable are one or more selected from a styrene-butadiene-styrene block polymer and a hydrogenated styrene-ethylene-butylene-styrene block polymer (SEBS); and furthermore preferable is a hydrogenated styrene-ethylene-butylene-styrene block polymer (SEBS).

In the thermoplastic resin composition for cleaning a molding processing machine of the present invention, a content ratio of component (C) is, from the viewpoint of enhancing the cleaning performance, preferably 0.5 to 20 parts by mass, more preferably 1 to 15 parts by mass, further preferably 1 to 12 parts by mass, and further preferably 2 to 7 parts by mass relative to the total of 100 parts by mass of component (A).

The thermoplastic resin composition for cleaning a molding processing machine of the present invention preferably further contains an inorganic filler as component (D) from the viewpoint of enhancing the cleaning performance.

As the inorganic filler of component (D), a granule or powder filler, or a fibrous filler can be used.

Examples of the granule or powder filler include talc, titanium dioxide, silica, mica, calcium sulfate, calcium carbonate (heavy calcium carbonate, precipitated calcium carbonate), barium carbonate, magnesium carbonate, magnesium sulfate, barium sulfate, oxysulfate, tin oxide, alumina, kaolin, silicon carbide, metal powder, glass powder, glass flakes and glass beads; and these may be used alone or in combination of two or more thereof.

The granule or powder filler has an average particle size of preferably 100 μm or less, more preferably 50 μm or less, further preferably 10 μm or less, and particularly preferably 5 μm or less. The average particle size is measured by a sedimentation balance method and indicated as a 50% median particle size.

Examples of the fibrous filler include wollastonite, glass fiber, milled fiber of glass fiber, potassium titanate whisker, aluminum borate whisker, zinc oxide whisker and attapulgite; and these may be used alone or in combination of two or more thereof.

From the viewpoint of enhancing the cleaning performance, component (D) is preferably one or more selected from talc and glass fiber, and it is more preferably talc.

In the thermoplastic resin composition for cleaning a molding processing machine of the present invention, a content ratio of component (D) is, from the viewpoint of enhancing the cleaning performance, preferably 0.1 to 10 parts by mass, more preferably 0.1 to 5 parts by mass, further preferably 0.1 to 3 parts by mass, and further preferably 0.5 to 2 parts by mass relative to the total of 100 parts by mass of component (A).

The thermoplastic resin composition for cleaning a molding processing machine of the present invention can be produced by pre-mixing the above components by a mixer such as a Henschel mixer, a tumbler blender or a kneader; and then, by kneading by an extruder, or by melt-kneading by a heating roller and a Banbury mixer.

The thermoplastic resin composition for cleaning a molding processing machine of the present invention is suitable as a thermoplastic resin composition for cleaning an extrusion molding processing machine or an injection molding processing machine, and more suitable as a thermoplastic resin composition for cleaning an extrusion molding processing machine.

EXAMPLES

Examples and Comparative Examples

Respective components for each composition indicated in Tables 1 and 2 were mixed by a tumbler blender, and melt-kneaded by an extruder, so that pellet-like resin compositions were obtained. These compositions were used to perform a cleaning test by a method described below. Results are shown in Tables 1 and 2.

Evaluation of Detergency for Extrusion Molding Processing Machine

An extrusion molding machine (GT-25A manufactured by Research Laboratory of Plastics Technology Co., Ltd.) was used to extrusion-mold 1 kg of a black colored product (black coloring agent concentration: 1 mass %) of HIPS (high-impact polystyrene) as a precedingly-used resin under conditions of a screw rotation number of 100 rpm and a resin temperature of 210° C.

Thereafter, each composition of Table 1 was fed into a hopper of the extrusion molding machine and extruded; the timing when the black color of the precedingly-used resin disappeared was taken as the termination of cleaning; and the detergency was evaluated based on the amount (kg) of the composition that has been used until the timing. It can be said that the smaller the amount of a resin composition used for cleaning, the more excellent the detergency thereof.

Evaluation of Detergency for Injection Molding Processing Machine

An injection molding machine (α-S150iA manufactured by Fanuc Corporation) was used to injection-mold 1 kg of black colored products (black coloring agent concentration: 3 mass %) of polypropylene as a precedingly-used resin under condition of a cylinder temperature of 230° C.

Thereafter, each composition of Table 2 was fed into an injection molding machine and injection-molded; the timing when the black color of the precedingly-used resin disappeared was taken as the termination of cleaning; and the detergency was evaluated based on the amount (kg) of the composition that has been used until the timing. It can be said that the smaller the amount of a resin composition used for cleaning, the more excellent the detergency thereof.

Further, after the termination of cleaning, the detergency (the presence or absence of a residue of the precedingly-used resin) was evaluated in terms of whether or not the black color of the precedingly-used resin (the black colored product of polypropylene) was found when a HDPE resin (HI-ZEX5300B manufactured by Prime Polymer Co., Ltd.) was fed into an injection molding machine and injection-molded. It can be said that when the black color of the precedingly-used resin is not found, a resin composition used for cleaning is excellent in the detergency.

Component (A)

A-1: HDPE (Nipolon Hard 6900B manufactured by Tosoh Corporation, MFR: 0.07)
A-2: HDPE (Nipolon Hard 6000 manufactured by Tosoh Corporation, MFR: 0.15)
A-3: Polypropylene (SunAllomer PM472W manufactured by SunAllomer Ltd., MFR: 2.7)
A-4: LLDPE (Nipolon-L T240F manufactured by Tosoh Corporation, MFR: 1.6)
A-5: Polypropylene (SunAllomer PL400A manufactured by SunAllomer Ltd., MFR: 2.0)

MFRs (g/10 min) of A-1, A-2 and A-4 were values measured under the conditions of a temperature of 190° C. and a load of 2.16 kg based on ISO 1133; and MRFs (g/10 min) of A-3 and A-5 were values measured under the conditions of a temperature of 230° C. and a load of 2.16 kg based on ISO 1133.

Component (B)

B1-1: Polyoxyethylene distearate (manufactured by Kao Corporation, HLB: 18.9)
B2-1: Monoglyceride hydroxystearate (manufactured by Riken Vitamin Co., Ltd., HLB:3.4)
B2-2: Sorbitan tribehenate (manufactured by Riken Vitamin Co., Ltd., HLB: 2.5)
B2-3: Diglycerin stearate (manufactured by Riken Vitamin Co., Ltd., HLB: 5.7)

Component (B') (Comparative Component to Component (B))

B'-1: Sodium α-olefin sulfonate (manufactured by DKS Co., Ltd.)
B'-2: Sodium stearate (manufactured by ADEKA)
B'-3: Zinc stearyl acid phosphate (LBT-1830 manufactured by Sakai Chemical Industry Co., Ltd.)

Component (C)

C-1: SEBS (Tuftec 1043 manufactured by Asahi Kasei Chemicals Corporation, styrene/ethylene.butylene (molar ratio)=67/33)
C-2: SEBS (Tuftec 1221 manufactured by Asahi Kasei Chemicals Corporation, styrene/ethylene.butylene (molar ratio)=12/88)
C-3: SBS (Asaprene T-437 manufactured by Asahi Kasei Corporation, styrene/butadiene (molar ratio)=30/70)

Component (D)

D-1: Talc (PHSH talc manufactured by Takehara Kagaku Kogyo Co., Ltd.)

Component (E) (Other Component)

E-1: MS (Cevian MAS30 manufactured by Daicel Polymer Ltd.)
E-2: EMA (Elvaloy AC 1820 manufactured by Du Pont Mitsui Polychemical Co., Ltd.)

TABLE 1

|  |  |  | \multicolumn{8}{c}{Examples} |
| --- | --- | --- | --- | --- | --- | --- | --- | --- | --- | --- |
|  |  |  | 1-1 | 1-2 | 1-3 | 1-4 | 1-5 | 1-6 | 1-7 | 1-8 |
| Resin composition for cleaning (parts by mass) | (A) | A-1 | 100 | 100 | 100 |  | 100 | 100 | 100 | 100 |
|  |  | A-2 |  |  |  | 100 |  |  |  |  |
|  |  | A-3 |  |  |  |  |  |  |  |  |
|  |  | A-4 |  |  |  |  |  |  |  |  |
|  | (B) | B1-1 | 3 | 3 | 3 | 3 | 3 | 3 | 3 | 3 |
|  |  | B2-1 |  | 3 | 3 | 3 |  | 3 | 3 | 3 |
|  |  | B2-2 |  |  |  |  | 3 |  |  |  |
|  |  | B2-3 |  |  |  |  |  |  |  |  |
|  | (B') | B'-1 |  |  |  |  |  |  |  |  |
|  |  | B'-2 |  |  |  |  |  |  |  |  |
|  |  | B'-3 |  |  |  |  |  |  |  |  |
|  | (C) | C-1 |  |  |  |  |  | 5 |  |  |
|  |  | C-2 |  |  |  |  |  |  | 5 |  |
|  |  | C-3 |  |  |  |  |  |  |  | 5 |
|  | (D) | D-1 | 1 | 1 |  | 1 | 1 | 1 | 1 | 1 |
|  | (E) | E-1 |  |  |  |  |  |  |  |  |
|  |  | E-2 |  |  |  |  |  |  |  |  |
| Used amount of composition (kg) |  |  | 0.2 | 0.15 | 0.2 | 0.25 | 0.2 | 0.15 | 0.15 | 0.2 |

|  |  |  | \multicolumn{7}{c}{Comparative Examples} |
| --- | --- | --- | --- | --- | --- | --- | --- | --- | --- |
|  |  |  | 1-1 | 1-2 | 1-3 | 1-4 | 1-5 | 1-6 | 1-7 |
| Resin composition for cleaning (parts by mass) | (A) | A-1 | 100 | 100 | 100 | 100 | 100 | 30 |  |
|  |  | A-2 |  |  |  |  |  |  |  |
|  |  | A-3 |  |  |  |  |  | 60 |  |
|  |  | A-4 |  |  |  |  |  |  | 55 |
|  | (B) | B1-1 |  |  |  |  |  |  |  |
|  |  | B2-1 |  | 3 |  | 3 |  |  |  |
|  |  | B2-2 |  |  | 3 | 3 |  |  |  |
|  |  | B2-3 |  |  |  |  |  |  | 3 |
|  | (B') | B'-1 |  |  |  |  | 3 |  |  |
|  |  | B'-2 |  |  |  |  |  |  | 3 |
|  |  | B'-3 |  |  |  |  |  |  | 1 |
|  | (C) | C-1 |  |  |  |  |  | 10 |  |
|  |  | C-2 |  |  |  |  |  |  |  |
|  |  | C-3 |  |  |  |  |  |  |  |
|  | (D) | D-1 | 1 | 1 | 1 | 1 |  |  |  |
|  | (E) | E-1 |  |  |  |  |  |  | 40 |
|  |  | E-2 |  |  |  |  |  |  | 5 |
| Used amount of composition (kg) |  |  | 0.4< | 0.35 | 0.4< | 0.4< | 0.4< | 0.4< | 0.4< |

For the evaluation on the detergency in Table 1, Comparative Example described with the expression "0.4<" as a used amount (kg) of composition indicates that the amount of the thermoplastic resin composition used for cleaning exceeded 0.4 kg.

TABLE 2

|  |  |  | \multicolumn{6}{c}{Examples} | \multicolumn{2}{c}{Comparative Examples} |
| --- | --- | --- | --- | --- | --- | --- | --- | --- | --- | --- |
|  |  |  | 2-1 | 2-2 | 2-3 | 2-4 | 2-5 | 2-6 | 2-1 | 2-2 |
| Resin composition for cleaning (parts by mass) | (A) | A-5 | 100 | 100 | 100 | 100 | 100 | 100 | 100 | 100 |
|  | (B) | B1-1 | 3 | 3 | 3 | 3.2 | 3.2 | 3.2 |  |  |
|  |  | B2-1 |  | 3 | 3 | 3.2 | 3.2 | 3.2 | 3 | 3.2 |
|  | (C) | C-1 |  |  |  |  | 5.3 | 5.3 | 5.3 |  | 5.3 |
|  | (D) | D-1 |  |  | 1 | 1.1 | 5.3 | 10.5 |  |  |
| Used amount of composition (kg) |  |  | 1.4 | 1 | 1 | 1 | 1.2 | 1.4 | 1.6 | 1.6 |
| Presence or absence of residue of antecedently-used resin |  |  | Absence | Absence | Absence | Absence | Absence | Absence | Presence | Presence |

The invention claimed is:

1. A thermoplastic resin composition for cleaning a molding processing machine which employs a solid raw material, the composition comprising:
   (A) an olefin-based resin; and
   (B) (B1) a nonionic surfactant having an HLB of 16 to 20, wherein the composition contains the component (B) in an amount of 0.5 to 10 parts by mass relative to 100 parts by mass of the component (A).

2. The thermoplastic resin composition for cleaning a molding processing machine which employs a solid raw material according to claim 1, further comprising (B2) a nonionic surfactant having an HLB of 1 to 12 as the component (B).

3. The thermoplastic resin composition for cleaning a molding processing machine which employs a solid raw material according to claim 1, wherein the component (B1) is a polyoxyethylene fatty acid ester.

4. The thermoplastic resin composition for cleaning a molding processing machine which employs a solid raw material according to claim 2, wherein the component (B2) is one or more selected from a glycerin fatty acid ester and a sorbitan fatty acid ester.

5. The thermoplastic resin composition for cleaning a molding processing machine which employs a solid raw material according to claim 2, wherein a content ratio of the component (B1) in the total amount of the component (B1) and the component (B2) is 10 to 90 mass %.

6. The thermoplastic resin composition for cleaning a molding processing machine which employs a solid raw material according to claim 1, further comprising (C) a thermoplastic elastomer.

7. The thermoplastic resin composition for cleaning a molding processing machine which employs a solid raw material according to claim 6, wherein the component (C) is one or more selected from a styrene-butadiene-styrene block polymer (SBS), a styrene-isoprene-styrene block polymer (SIS), a hydrogenated styrene-ethylene-butylene-styrene block polymer (SEBS), a hydrogenated styrene-ethylene-propylene-styrene block polymer (SEPS), an ethylene-α olefin-based polymer, an ethylene-α olefin-polyene polymer, silicone rubber, acrylic rubber, and a butadiene-(meth) acrylate polymer.

8. The thermoplastic resin composition for cleaning a molding processing machine which employs a solid raw material according to claim 6, wherein the composition contains the component (C) in an amount of 0.5 to 20 parts by mass relative to a total of 100 parts by mass of the component (A).

9. The thermoplastic resin composition for cleaning a molding processing machine which employs a solid raw material according to claim 1, further comprising (D) an inorganic filler.

10. The thermoplastic resin composition for cleaning a molding processing machine which employs a solid raw material according to claim 9, wherein the component (D) is one or more selected from talc and a glass fiber.

11. The thermoplastic resin composition for cleaning a molding processing machine which employs a solid raw material according to claim 9, wherein the composition contains the component (D) in an amount of 0.1 to 10 parts by mass relative to a total of 100 parts by mass of the component (A).

12. The thermoplastic resin composition for cleaning a molding processing machine which employs a solid raw material according to claim 1, wherein the composition is for cleaning an extrusion molding processing machine or an injection molding processing machine.

13. The thermoplastic resin composition for cleaning a molding processing machine which employs a solid raw material according to claim 1, wherein the nonionic surfactant is hydrophilic.

14. The thermoplastic resin composition for cleaning a molding processing machine which employs a solid raw material according to claim 1, wherein the thermoplastic resin composition for cleaning is a solid at room temperature.

* * * * *